(12) United States Patent
Morrison et al.

(10) Patent No.: US 8,019,194 B2
(45) Date of Patent: Sep. 13, 2011

(54) DIGITAL AUDIO AND VIDEO RECORDING AND STORAGE SYSTEM AND METHOD

(75) Inventors: Michael Morrison, Corona Del Mar, CA (US); James A. Rannalli, Reno, NV (US); Stephen Roach, Reno, NV (US); Christopher L. Romine, Genoa, NV (US)

(73) Assignee: S. two Corp., Reno, NV (US)

( * ) Notice: Subject to any disclaimer, the term of this patent is extended or adjusted under 35 U.S.C. 154(b) by 1141 days.

(21) Appl. No.: 11/100,211

(22) Filed: Apr. 5, 2005

(65) Prior Publication Data

US 2005/0254776 A1 Nov. 17, 2005

Related U.S. Application Data

(60) Provisional application No. 60/559,001, filed on Apr. 5, 2004.

(51) Int. Cl.
| | |
|---|---|
| H04N 9/80 | (2006.01) |
| H04N 5/44 | (2011.01) |
| H04N 5/76 | (2006.01) |
| H04N 5/89 | (2006.01) |
| H04N 5/93 | (2006.01) |
| H04N 5/765 | (2006.01) |
| H04N 7/12 | (2006.01) |
| H04N 7/18 | (2006.01) |
| G03B 19/18 | (2006.01) |
| G06F 1/26 | (2006.01) |
| G06F 9/00 | (2006.01) |
| G06F 13/00 | (2006.01) |
| G06F 13/14 | (2006.01) |
| G06F 15/177 | (2006.01) |
| G11B 27/02 | (2006.01) |
| G11C 8/00 | (2006.01) |
| H01L 29/788 | (2006.01) |
| H01R 13/62 | (2006.01) |
| H02H 3/00 | (2006.01) |
| H02H 3/20 | (2006.01) |
| H04J 3/00 | (2006.01) |
| H04J 3/02 | (2006.01) |
| H04J 3/04 | (2006.01) |
| H05K 1/00 | (2006.01) |

(52) U.S. Cl. ........ 386/239; 386/231; 386/280; 386/281; 386/293; 386/334; 386/335; 257/315; 257/316; 348/734; 352/38; 361/42; 361/91.1; 365/185.01; 365/185.09; 365/239; 369/47.13; 370/535; 370/537; 370/539; 370/540; 375/240.12; 375/240.18; 375/240.24; 439/61; 439/260; 709/222; 710/305; 711/112; 711/145; 711/154; 711/156; 711/170; 713/1; 713/320; 725/76; 725/77

(58) Field of Classification Search ............ 386/46, 386/83, 122, 123, 124, 125, 126, E5.001, 386/E9.025, 52, 55, E5.002, E5.012, E9.045; 174/59; 257/315, 316; 348/734, E5.043, 348/E5.049, E5.051, E5.102, E7.071, E7.083; 352/38; 361/42, 91.1, 622; 365/185.01, 365/185.09, 239; 369/47.13; 370/351, 395.31, 370/464, 535, 537, 539, 540; 379/202.01; 428/848.9; 463/36; 705/52, 57; 707/2, 205, 707/E17.009; 709/222, 245; 711/112, 145, 711/154, 156, 170, 211, E12.006; 712/E9.063, 712/E9.071; 713/1, 320; 714/13, 45, 54, 714/57, E11.025; 717/151; 375/240.12, 375/240.18, 240.24, E7.189, E7.198, E7.211; 725/76, 77; 439/61, 108, 260, 607.02; 710/305
See application file for complete search history.

(56) References Cited

U.S. PATENT DOCUMENTS

| | | | | |
|---|---|---|---|---|
| 4,868,702 A | * | 9/1989 | Itou et al. | 361/42 |
| 5,249,270 A | * | 9/1993 | Stewart et al. | 709/222 |
| 5,274,602 A | * | 12/1993 | Glenn | 365/239 |
| 5,355,132 A | * | 10/1994 | Kani et al. | 341/55 |
| 5,592,398 A | * | 1/1997 | Terauchi et al. | 370/535 |
| 5,619,644 A | * | 4/1997 | Crockett et al. | 714/45 |
| 5,721,396 A | * | 2/1998 | Daoud | 174/59 |
| 5,825,739 A | * | 10/1998 | Saito et al. | 369/47.13 |
| 6,185,367 B1 | * | 2/2001 | Keery et al. | 386/122 |

| | | |
|---|---|---|
| 6,400,887 B1 * | 6/2002 | Takano et al. .................. 386/52 |
| 6,447,317 B1 * | 9/2002 | Billman ........................ 439/260 |
| RE38,142 E * | 6/2003 | Berry et al. .................... 725/77 |
| 6,658,437 B1 * | 12/2003 | Lehman ........................ 707/205 |
| 7,039,073 B1 * | 5/2006 | Muntz et al. .................. 370/539 |
| 2002/0034603 A1 * | 3/2002 | Nee ............................. 428/64.1 |
| 2002/0061098 A1 * | 5/2002 | Raniere et al. ........... 379/202.01 |
| 2002/0123249 A1 * | 9/2002 | Izzo .............................. 439/61 |
| 2003/0135682 A1 * | 7/2003 | Fanning ........................ 710/305 |
| 2003/0142952 A1 * | 7/2003 | Oka et al. ....................... 386/46 |
| 2003/0156649 A1 * | 8/2003 | Abrams, Jr. ............... 375/240.24 |
| 2003/0179741 A1 * | 9/2003 | Goergen ........................ 370/351 |
| 2003/0196128 A1 * | 10/2003 | Lin ................................ 713/320 |
| 2004/0015637 A1 * | 1/2004 | Yau ................................ 710/313 |
| 2004/0131341 A1 * | 7/2004 | Lien .............................. 386/125 |
| 2004/0233930 A1 * | 11/2004 | Colby, Jr. ....................... 370/464 |
| 2005/0134801 A1 * | 6/2005 | Bogdanowicz et al. ........ 352/38 |
| 2005/0177516 A1 * | 8/2005 | Vandewater et al. ........... 705/57 |
| 2005/0181873 A1 * | 8/2005 | Bond .............................. 463/36 |
| 2005/0193188 A1 * | 9/2005 | Huang .............................. 713/1 |
| 2006/0008256 A1 * | 1/2006 | Khedouri et al. ............. 386/124 |

\* cited by examiner

*Primary Examiner* — Thai Tran
*Assistant Examiner* — Syed Hasan
(74) *Attorney, Agent, or Firm* — Holland & Hart LLP (57) ABSTRACT

An integrated apparatus is disclosed that can directly connect to a portable digital video camera and can record uncompressed video and audio data, along with associated metadata, in the field and elsewhere. Most preferably, the integrated apparatus includes a removable, recordable, reusable digital magazine that may be mounted. Most preferably, the integrated apparatus also supports a variety of input and output formats, and the apparatus may be easily connected to other computing systems, either directly or through network connections, wired or wireless. The digital magazine can be mounted in a variety of docking stations and can be directly connected to a network, allowing the video and audio data to be easily stored and transferred.

16 Claims, 9 Drawing Sheets

DIGITAL AUDIO AND VIDEO RECORDING AND STORAGE SYSTEM AND METHOD

RELATED APPLICATION DATA

This application claims the benefit of U.S. Provisional Application No. 60/559,001, filed Apr. 5, 2004, entitled "Digital Audio and Video Recording and Storage Apparatus, System and Methods of Use," the disclosure of which is incorporated by reference.

COPYRIGHT AUTHORIZATION

A portion of the disclosure of this patent document contains material which is subject to copyright protection. The copyright owner has no objection to the facsimile reproduction by any one of the patent disclosure, as it appears in the Patent and Trademark Office patent files or records, but otherwise reserves all copyright rights whatsoever.

TECHNICAL FIELD

This invention pertains to the field of digital imaging and, more specifically, to digital audio and video image storage in a portable reusable digital recording device and the transfer and use of the images and device.

BACKGROUND

The professional movie making industry has long been seeking to record audio and high definition video in digital format in the field and then transfer the recorded digital format audio and high definition video to production and post-productions systems. One long-sought goal of the professional movie making industry has been to record the digital audio and high definition video in what is commonly referred to as "analog" format—without compressing the digital audio and video. Compressing audio or video when recorded in the field not only results in loss of digital information that may be required to preserve the highest quality digital recording possible but also renders subsequent editing and production more difficult or even impossible with any acceptable degree of quality in the resulting audio and video product.

One digital audio and video recording solution used in the industry utilizes one or more large trucks loaded with racks of computing systems and digital storage disk arrays. The user must drive the truck to the location of a video shoot, connect a digital camera and microphones to the truck-based system in the field, record and store digital audio and video on the truck-based system, move the truck-based system around in the field as required to record the desired audio and video, drive the truck-based system back to the production studio when recording is concluded, connect the truck-based system to a network at the production studio, and then transfer the recorded audio and video over the network connection for use of the recorded audio and video in production and post-production systems. This common prior art system is expensive, awkward, labor intensive, and inefficient.

One prior art system requires at least two large and heavy boxes of equipment. One box contains computing equipment for use in the field, and the second box contains disk drives. The two boxes are typically mounted and truck transported to the field location for a video shoot, and interconnected by input/output cables in the field in order to record and store digital audio and video in the field. This box-based system is quite heavy, usually truck-based, difficult to transport from location to location, expensive, and awkward.

One solution has provided digital audio and video storage disk drives connected to a conventional, bulky computing system by low insertion force (LIF) connectors. A user can thereby record and store compressed digital audio and video on the drives, remove the drives, transport the drives, and re-connect the drives to the same or another conventional computing system. These systems have been largely used only in connection with compressed digital audio and video and the large size makes them impractical for field use.

Although the laptop computing systems have long utilized LIF connectors to connect with laptop docking stations, laptop-based systems are limited in their capabilities. They are not capable of providing the power, storage capacity, and feature set required to accomplish professional field recording of digital audio and video.

SUMMARY

A portable digital film recording system is disclosed, which comprises: a portable case; a computer; an LCD display; at least one removable, reusable digital magazine for storing computer-readable digital data. The digital data itself may be composed of uncompressed high definition video footage, uncompressed audio footage, and metadata. The digital magazine comprises: digital storage devices, connectors; a digital magazine receiver, a control and connector panel used to connect to external devices. A variety of external devices are supported, including, but not limited to, a camera, a video monitor, an audio recorder, headphones, a computer network, an edit controller, a microphone, and a signal generator. Software is also provided which is used for communication between external devices and the digital magazine. Power sources, such as a 24V DC power source; are provided, and the portable digital film recording system has a total weight of not over 44 lbs.

Docking stations that can use the digital magazine are also disclosed. These docking stations include a cloning station, an archiving station, and a station that allows easy access to a network.

Additional features and advantages will become apparent from the following detailed description of illustrated embodiments, which proceeds with reference to accompanying drawings.

DETAILED DESCRIPTION

Overview

In the preferred embodiments disclosed herein, the Digital Film Recording System is comprised of several platforms and a common digital magazine storage device (D.MAG). The Digital Field Recorder (DFR) is encased in a rugged, completely self-contained, DC (battery)-powered, portable chassis. It records uncompressed high-resolution video images directly from a high-definition video camera onto portable, removable disk-based digital magazines. In some embodiments it also records digital audio signals from an external source. The DFR contains video input/output and audio input/output circuitry, a computer motherboard running an operating system, and specialized application software, and multiple control and signal conversion circuit boards. The DFR incorporates a specially designed "receiver" that accepts and provides a specialized connector for the D.MAG digital magazine.

In one embodiment, up to thirty eight (38) connectors on the DFR provide input and output connections for external devices such as cameras, video monitors, audio recorders, headphones, edit controllers, interface and control devices, external power supplies, and signal generators. The DFR software transfers the video and audio data from the input/output boards to the D.MAG digital magazine in a computer-readable file format. It also catalogs and organizes the data into "productions," "scenes," and "takes" according to parameters set by the user of the system. The DFR replaces traditional video tape recorders, using digital magazines in lieu of tape cartridges, and storing the images in computer-readable digital files in lieu of magnetic analog signals that must be converted later to digital information.

The preferred embodiment also includes an archival docking station (A.DOCK), a cloning docking station (C.DOCK), and a network docking station (E.DOCK), which allows transfer of data across a network. These docking stations comprise a desktop-type chassis or case, one or two "receivers" for D.MAG digital magazines identical to that in the DFR, and computer network connections. Moreover, the docking stations are low-cost platforms that facilitate the transfer of the digital video and audio files from the D.MAGs to computer networks or storage devices.

Exemplary System Embodiment

Figure 1A:
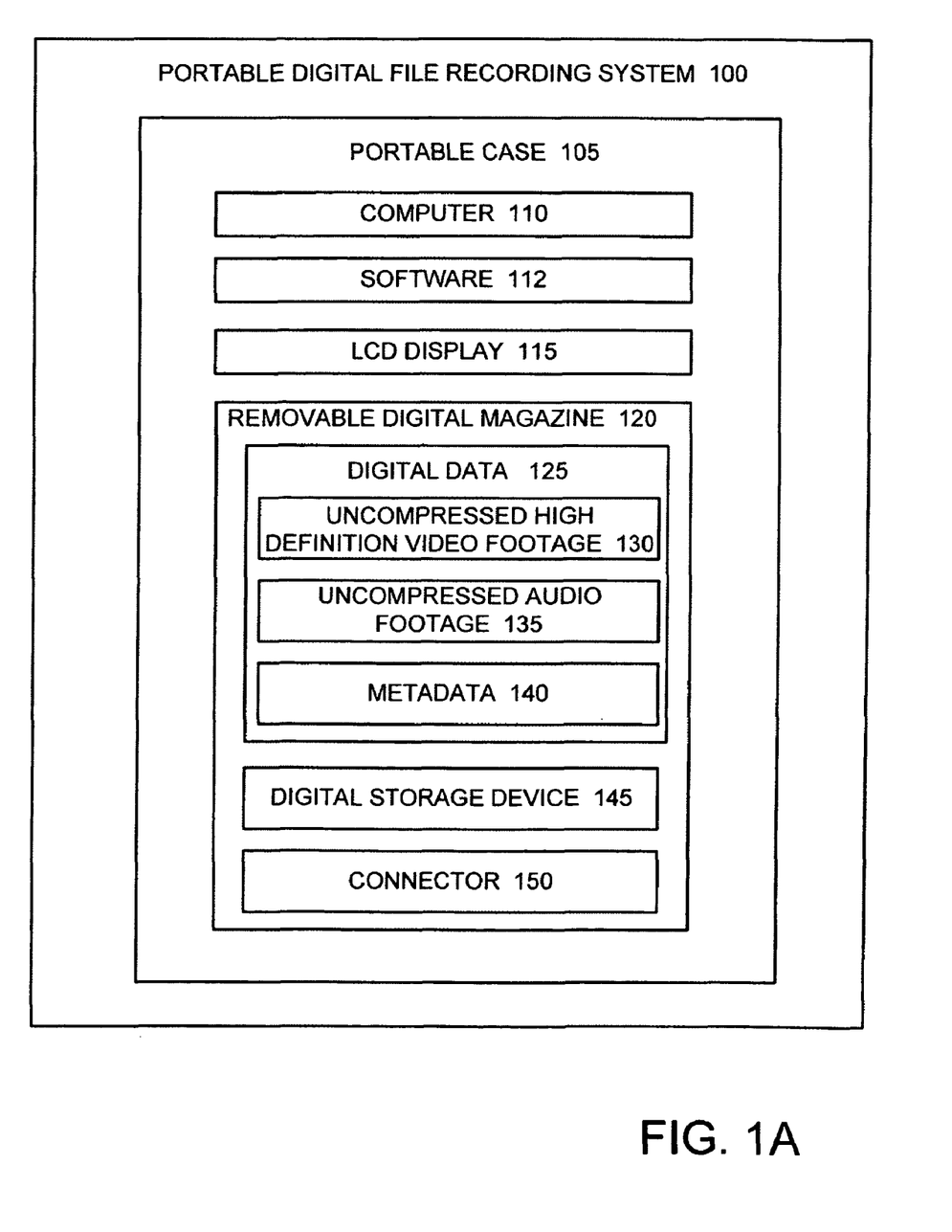
FIG. 1A is a block diagram of a video recorder system that can be used to implement the integrated digital audio and video recording apparatus described herein.
Figure 1B:
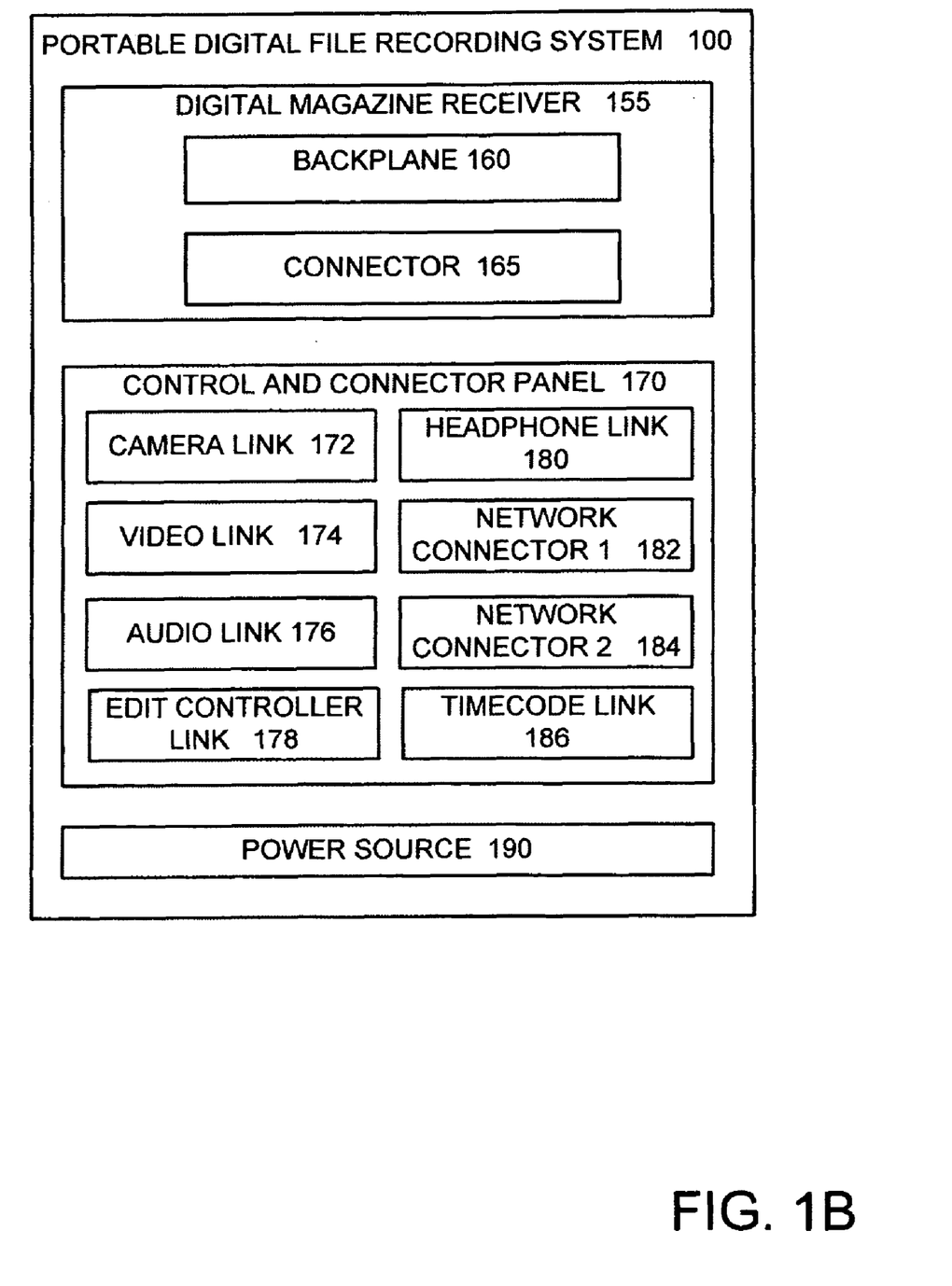
FIG. 1B is a continuation of the block diagram of a video recorder system shown in FIG. 1A.

FIGS. 1A and 1B illustrate an exemplary embodiment of an integrated digital audio and high definition video recording system 100, also called a field recorder, or a DFR. The modules shown within the DFR and the relationships between them indicate the main components in the DFR; other components and relationships are not shown for the sake of simplicity. In particular, FIGS. 1A and 1B usually do not show specific wiring or layout information, or input or output format. Depending on implementation, modules of the portable digital file recording system 100 can be added, omitted, split into multiple modules, combined with other modules, and/or replaced with like modules. In alternative embodiments, portable DFRs 100 with different modules and/or other configurations of modules perform one or more of the described techniques.

The system 100, in general, provides quiet mode operation, which quiets fan noise, about other things, for those times when any excess noise might be obtrusive, such as when recording. The system is also designed to be operated in any orientation, and can be operated in a variety of atmospheres, including in outer space and underwater. The DFR 100 is designed to be used primarily as a field recorder. However, by using an AC power adapter, or substituting an internal AC power supply for the internal DC power supply, the DFR can be utilized as a studio recorder.

The system 100 includes a case 105, which is designed to comply with checked luggage weight and dimension limitations of at least some of the major airlines. It preferably is rugged, and can be shipped using common carriers such as Fed-Ex, UPS, DHL, and others. Furthermore, it preferably weighs 44 pounds or less, and has handles or other grasping structures on the side to make it easy to carry into (and out of) the field. In one embodiment, the case is made out of aluminum to save weight, but in alternate embodiments, other materials could be used, such as a composite case attached to a steel frame.

Figure 5:
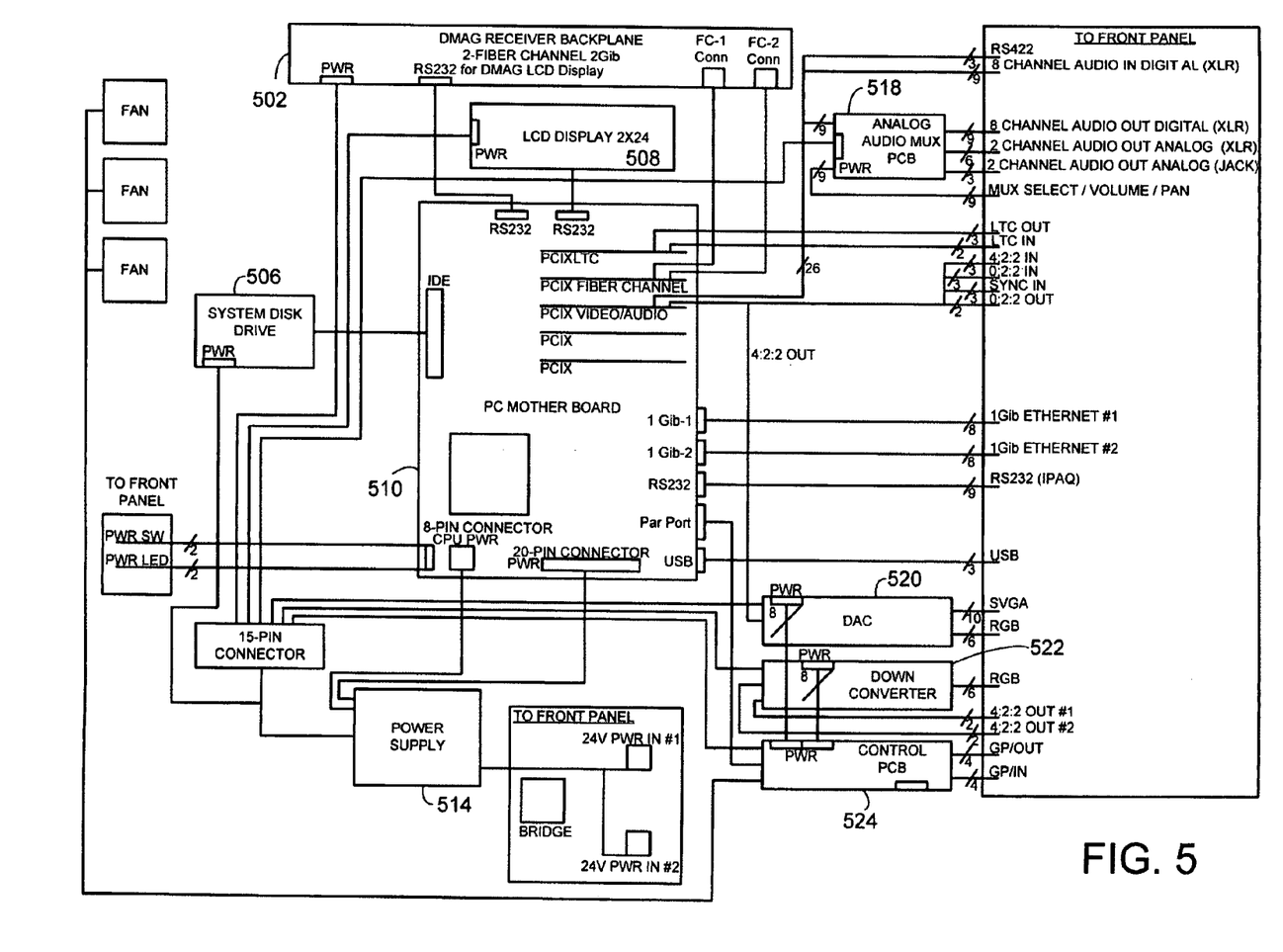
FIG. 5 is a block diagram of a hardware implementation of the portable digital file recording system described herein.

With reference to FIG. 5, and continuing reference to FIG. 1, The case 105 contains a computer 110 500. This computer comprises a computer motherboard, 510 video 520, 522 and audio 518 I/O printed circuit boards; a hard driv 506, and a display device 115, 508. This display device could be a flat LCD screen, or could be a different sort of device, known or inventive. The display device 1115, 508 is used (among other things) to provide status information about the portable digital file recording system 100, status information about devices that might be connected to the recording system 100, the capacity remaining within the storage units, and other information relevant to the recording system 100.

Figure 3:
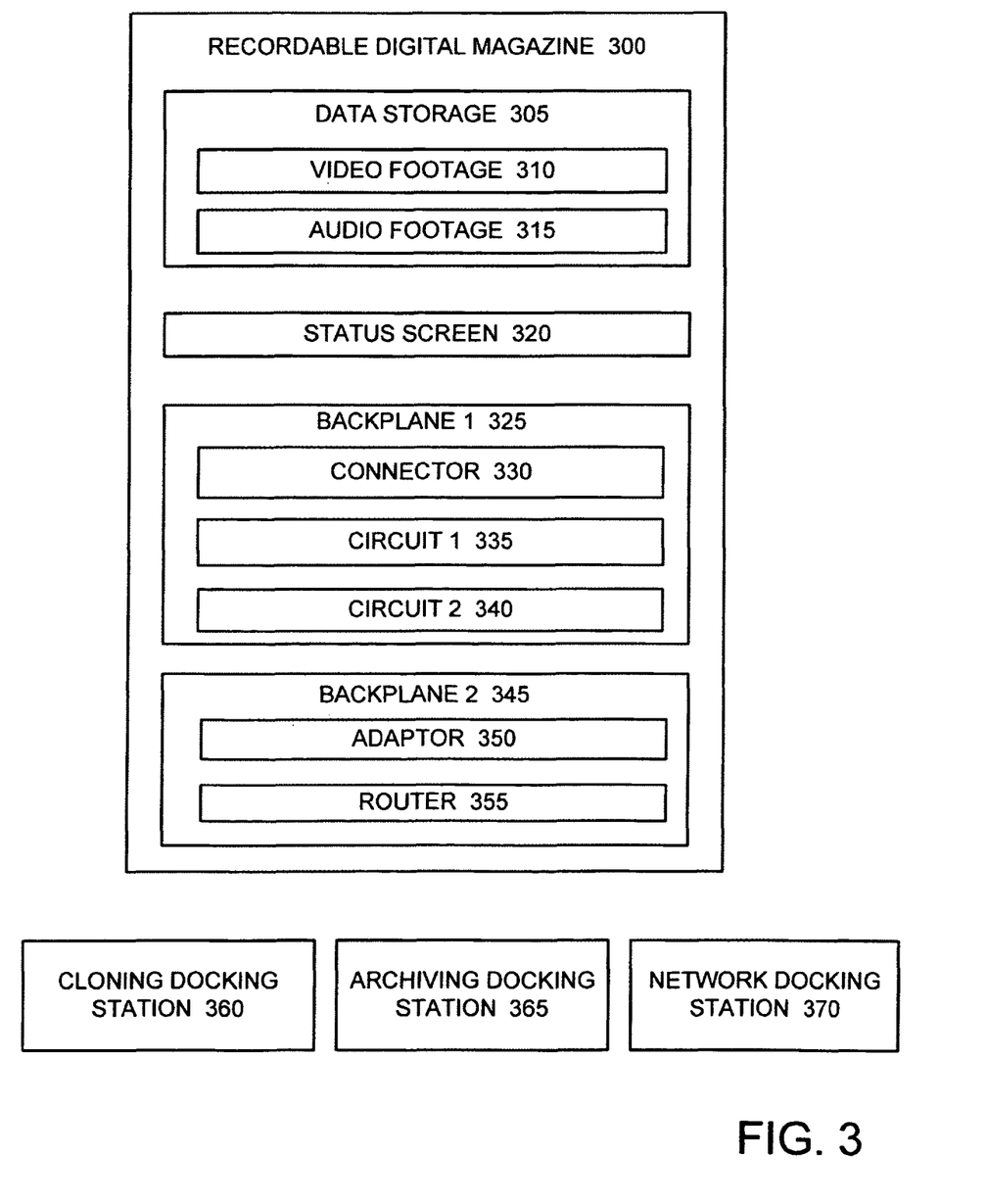
FIG. 3 is a block diagram of a recordable digital magazine as described herein.

The system 100 also contains one or more removable digital magazines 120, sometimes referred to as D.MAGs. As noted above, the D.MAG is a digital magazine which, among other uses, is the common medium that provides for the transport of digital images captured from a camera, digital audio signals captured from sound sources, and additional data that helps describe environmental factors associated with the recording. The D.MAG, which will be discussed in more detail with reference to FIG. 3, is mountable within the DFR 100, and should be able to be locked in position in the DFR 100, or in another apparatus. It is compact and portable; has handles or other grasping structures on the sides, weighs fifteen pounds or less, and should have an external housing that is small enough to be easily carried.

A connector 150 is included within the removable digital magazine 120 (D.MAG) which is used to interconnect the D.MAG 120 with other devices. The D.MAG preferably contains its own status screen, and should be able to be controlled by a remote computing device such as a laptop computer or a PDA. Information is stored on at least one, and preferably four or six high capacity digital information stored devices 145, such as hard drives or solid state media.

The information that is stored comprises uncompressed high definition video footage 130, uncompressed audio footage 135, and in some cases, metadata 140. In an alternative embodiment, compressed audio footage or compressed video footage may be stored.

At least one digital magazine receiver 155 connects the DFR 100 to the D.MAG 120. A connector 165, preferably a low insertion force connector, is used to make the D.MAG 120 connector 150 to the DFR 100. The receiver also comprises a backplane 160, and associated wiring.

A control and connector panel 170 is used by the DFR 100 preferably allowing the DFR 100 to be compatible with the maximum number of video products available. USB, Firewall, Gigabit Ethernet and RS422 connectors, a camera socket, and a variety of other connectors may each be present.

The control and connector panel includes a PCB 518 (D.MAG Control) to provide novel logic, circuitry, and functionality. This PCB allows the DFR (Digital Field Recorder) software to accept and interpret signals from external equipment such as cameras, and provide appropriate responses, including generating signals specific to cameras. For example, one signal may, in effect, inform the software that a camera has been placed in "record". The software is able to decode that signal and drive another signal on the D.MAG Control PCB that "tallies," or illuminates the "record" indicator in the camera viewfinder. Other signals include low battery voltage detection and tally reporting and an end-of-magazine warning indicator. The circuitry includes as input, an 8 channel audio-out digital line, and two 2 channel audio out analog lines.

The optional camera socket 172 may provide full trigger and tally functions, and provide status returns to a camera viewfinder. The tally light on the connected camera will be lit when the DFR 100 is recording. In addition, the DFR 100 will provide for the tally light to flash when the D.MAG nears the end of its record time. In an exemplary embodiment a slow flash starts at around 3 minutes of record time left, with the light flashing faster at 1 minute, and faster yet when less than 30 seconds of record time remains. The tally light can also be set up to flash when low power is detected.

A power source 190 514 is provided. Preferably the power connections are 24VDC. The voltage is internally regulated and will accept a range of 22V DC to 36 V DC. In one embodiment, there are two 24V connectors, which allows for battery change-over without interrupting recording. Optionally a 12V DC output is present; in one embodiment it is internally limited to 2 amps at 14 v and is provided to provide power for small portable monitors, hard drives, etc. It may also be used to provide power for some cameras. Some embodiments include an AC adaptor, and/or external batteries.

A computer network port 182 is optionally provided, which in a preferred embodiment, is a Gigabit Ethernet port. The port supports control and file transfers, and is designed (though not limited) to allow the up- and download of production information from and to the D.MAG for production and shot listing. The port should preferably be able to automatically adjust to lower bandwidth connections such as 100 Mbit and 10 Mbit. In a preferred embodiment, a second computer network port 184 is also provided. If both ports 182, 184 are present, they should be able to load and unload data simultaneously.

A video port 174 is preferably provided, as well. In an exemplary embodiment this is an industry standard SMPTE 292M connection. Some embodiments also or alternatively comprise an SMPTE 372M support which allows for dual link mode. In dual link mode the unit can be used for HD plus alpha for real time HD YUV and key recording and playout. The main video output can also be set to provide dual link to single link color space conversion, which allows users to view HD RGB dual link images on HD SDI monitors that do not have dual link capabilities. It can also be used to play into standard HD devices such as a VTR or switcher for test composites.

Video output images can be set to conform to a variety of differing standards for monitoring or for outputting to other devices. These standards include HD analog and optional HD down converter. HD analog outputs can be set to be either HD YUV or HD RGB. If set to HD RGB, the signal has sync on green. If set to HD YUV, the signal has sync on Y. The SVGA connector is preferably set to be a standard XGA signal—RGB+H 7 V sync. These allow users the maximum choice of monitors on allocation including multi-sync computer-style monitors or analog input plasma displays.

Sync in and sync loop connections are also preferably included. In an exemplary embodiment, the DFR 100 is set to auto sync, dependent on input. It should always reference to video input in record and EE modes. Reference can be either tr-level HD sync or Bi-level standard mixed sync including, and not limited to, color black, NTSC, or PAL.

In at least one embodiment, if there is a reference available on the sync input then the unit will find the reference and use it in playback. If there is no reference the unit will stay locked to video input in playback; if there is no sync input, the DFR will free run based upon the last known reference available. The sync provided should be the same as the format used, if reference lock is to be maintained.

An audio link 176 for input, output, and monitoring is also provided. It preferably provides full support for uncompressed digital audio record at 48 kHz, 24 bit, though other uncompressed speeds are also envisioned. An exemplary embodiment includes either 6 or 8 channels plus provides full monitoring capabilities. The audio channel, in some instantiations, is always on. The audio can be recorded either synchronizing it with the video recording, or can be recorded without synchronization.

The line outputs (in an exemplary embodiment) are analog line-driven, balanced audio outputs. They are preferably provided to drive line mixers or outboard analog recording devices. In addition, a preferable embodiment includes two sets of stereo headphone outputs 180.

Timecode connections 186—preferably analog LTC connections conforming to SMPTE 12—are also optionally provided. If provided, a timecode generator is also included which reshapes and cleans the input signal to ensure the correct timecode. The timecode generator should also be capable of running in at least one of internal, external, jam-sync, and freetime mode. The timecode can be preset for start code and can either be continuous, RECRUN, or follow a different format. In addition, some embodiments also provide for full support of embedded timecode conforming to SMPTE RP188 and/or RP215A, also referred to as VITC code or ANC data. Optionally, the DFR can convert LTC to ANC data providing both forms on playback. The ANC DATA space should be fully recorded and placed in the file header allowing any additional information, including metadata, can be stored with the video files.

Other connections, such as an edit controller 178, a GIPO connection, and an antenna connection may also be provided, as well as other connections known to those in the art.

2. Overview of Exemplary Methods

Described embodiments include techniques and tools for recording video and audio in the field on removable magazines, and then using the magazines. The flowchart elements described herein are only examples; other flowchart elements can be used in accordance with the described techniques. Furthermore, the flowchart elements can occur in different orders, or specific process blocks can be skipped in accordance with the described techniques and tools. The described techniques and tools can be used in combination with one another or with other techniques and tools, or can be used independently.

Figure 2A:
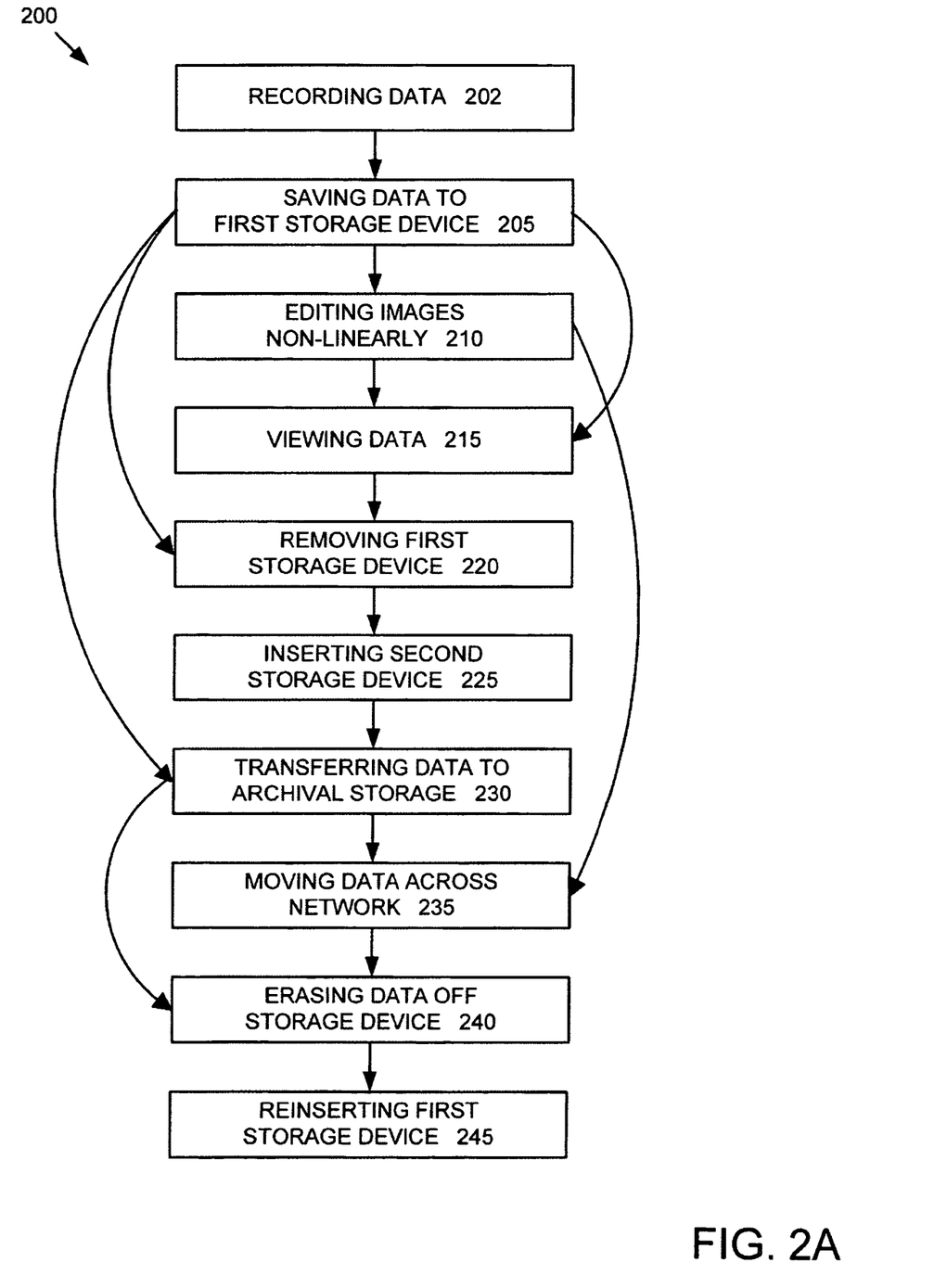
FIG. 2A is a flowchart of a suitable method for implementing a method to use the portable digital file recording system as described herein.
Figure 2B:
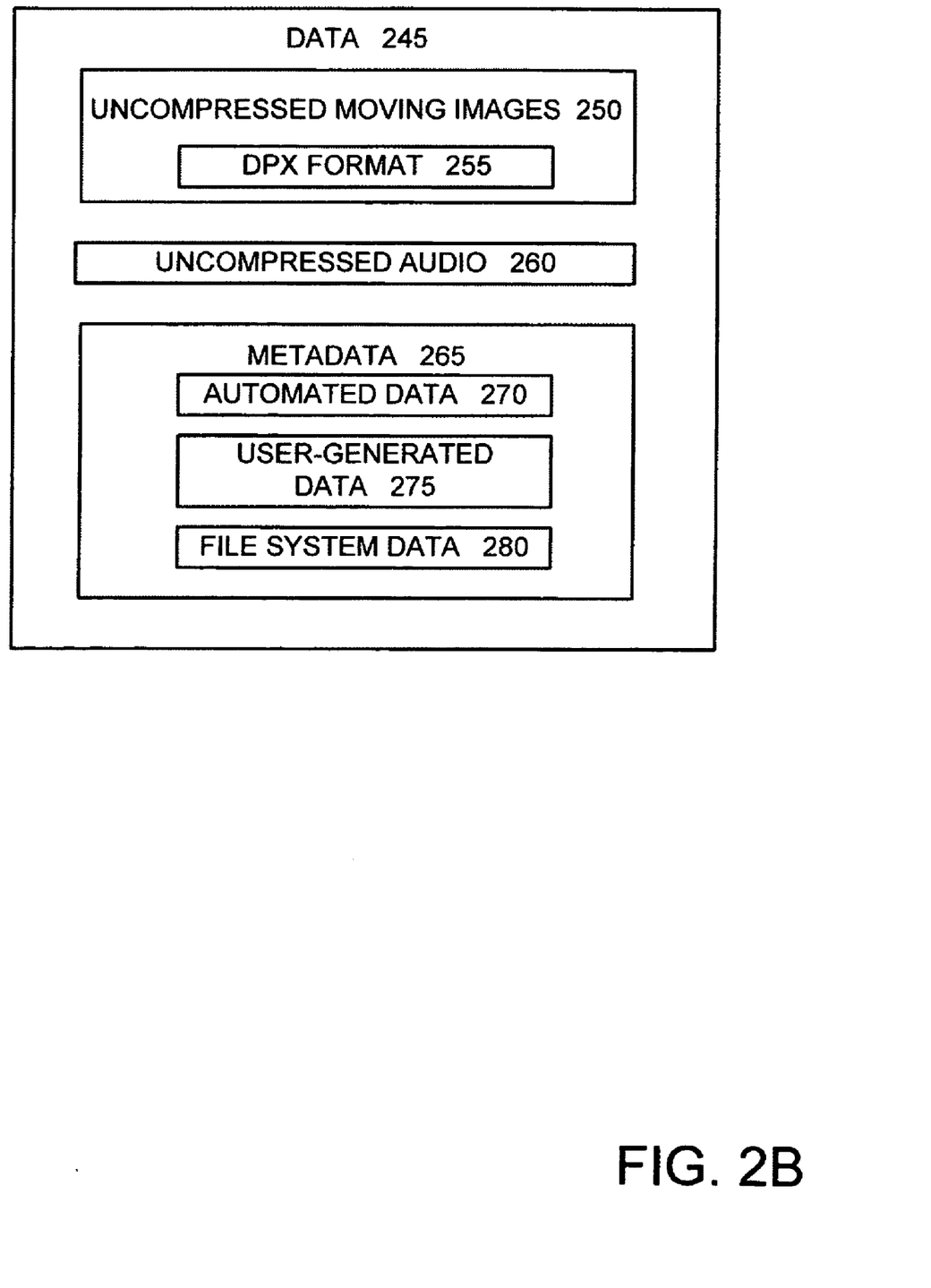
FIG. 2B is a block diagram of a suitable data format that can be used with the portable digital file recording system as described herein.

Referring to FIG. 2A, flowchart 200 shows a brief overview of the methods disclosed herein. At process block 202 data is recorded onto a portable recording apparatus. With reference to FIG. 2B, the data 247 comprises uncompressed moving image data 250 and uncompressed audio data 260. This data may be stored in DPX format 255.

In some embodiments, metadata 265 is also recorded. This metadata may consist of automated data 270, user generated data 275, and file system data 280.

With continuing reference to FIGS. 1A and 1B, user generated data 275 can be created in the system using software 112 provided with the DFR 100. This user-generated data can be input using a laptop computer, on a PDA, or using some other input method using a device that can be interfaced to the DFR 100. For example, preferably, any operating system can be accessed using one of the network connections 182, 184, or through Serial or USB connections.

User-generated data 275 generally includes complete details of the production including director, DP and operators names, non-changing production information and user data fields. Each reel also has the ability to add additional data for A or B or visual effects units, the scene has data pertaining to the specific details of each scene including data such as location, frame rate and standards. Each take then has additional data fields. All data headings include space for user generated notes. All data attaches directly to the files or to the production. This data is stored in a separate file—preferably a simple text file that can be exported read and edited in a wide variety of programs. This metadata file lists all relevant data for the shoot, the production, the scene and take. An example of such a file is shown below.

Reel
   Scene1
   Take
   Frames
   Scene2
   Take
   Frames
Directory Structure—D.MAG The file system data 280 uses both the automated data 270 and user-generated data 275 to ensure that each frame has a set of unique identifiers which guarantees that frames cannot be orphaned in an application. The frame name also includes a base set of identifiers so that from just a directory inquiry a frame should be able to be identified. The file system allows a traditional folder/directory approach to recording data to help users catalog and find frames of interest. A D.MAG reel has the structure of a master directory, with sub-directories, Scenes and Takes beneath that. In each Take directory the frames are stored as uniquely-named individual files uniquely named. This allows for D.MAG reels to be mounted and directory inquires made in an efficient manner. The filesystem data file 280, which resides at the reel level, preferably has full information for all details attaching to that reel and production so inquiries can be made of it for cataloging and search information. This file is easily parsed into a database application that accepts space delineated text files. A file name can either be defined by the user or a default file name can be used.

In a preferred embodiment, some information traditionally thought of as user-generated can be automatically provided. The user, preferably, can declare which information is to be automatically generated. For example, a user may have the system automatically provide reel and scene numbers.

Below is an example of an exemplary file system structure.
[PRODUCTION:0]
ProdName=none
ProdDate=3/29/2004
ProdDirector=none
ProdDp=none
ProdOperator=none
ProdUser1=User1:none
ProdUser2=User2:none
ProdUser3=User3:none
ProdUser4=User4:none
[REEL:1]
ReelNumber=1
ReelDate=3/29/2004
ReelDirector=none
ReelDP=none
ReelAssistant=none
ReelOperator=none
ReelUser1=User1:none
ReelUser2=User2:none
ReelUser3=User3:none
ReelUser4=User4:none
ReelLastScene=8
ReelFileSystem=LINUX_XFS
ReelFileFormat=DPX
[SCENE:1]
SceneNuniber=scene-1
SceneDate=3/29/2004
SceneTimecodeStart=00:02:03:22
SceneLocation=none
SceneUnit=none
SceneAudioChannels=none
SceneAudioType=Not Specified
SceneVideoFormat=1080psf_2500
SceneVideoSampleRate=RGB
SceneVideoBits=10
SceneVideoFrameBuffer=RGB
SceneTimecodeFormat=LTC_NDF
SceneTimecodeSource=INTERNAL
SceneTimecodeMode=RECORD_RUN
SceneTimecodeSync=SET_START
SceneField FrameFlag=Not Specified
SceneCameraType=VIPER
SceneCameraNumber=A
SceneNumberOfTakes=6
SceneLastTake=6
SceneNotes="None"
[TAKE:1]
TakeNumber=1
TakeNotes="None"
TakeTimecodeStart=00:00:00:01
TakeTimecodeEnd=00:00:15:24
TakeUserBits=00:00:00:00
TakeAltTimecodeEnd=00:00:00:00
TakeUMID=0
TakeCircle=0
TakeNumberOfFrames=399
[/TAKE]
[TAKE:2]
TakeNumber=2
TakeNotes="None"
TakeTimecodeStart=00:00:16:00
TakeTimecodeEnd=00:00:30:15
TakeUserBits=00:00:00:00
TakeAltTimecodeEnd=00:00:00:00
TakeUMID=0
TakeCircle=0
TakeNumberOfFrames=366
[/TAKE]
[TAKE:]
TakeNumber=3
TakeNotes="None"
TakeTimecodeStart=00:00:30:16
TakeTimecodeEnd=00:00:56:24
TakeUserBits=00:00:00:00

```
TakeAltTimecodeEnd=00:00:00:00
TakeUMID=0
TakeCircle=0
TakeNumberOfFrames=659
[/TAKE]
[TAKE:4]
TakeNumber=4
TakeNotes="None"
TakeTimecodeStart=00:00:57:00
TakeTimecodeEnd=00:01:19:15
TakeUserBits=00:00:00:00
TakeAltTimecodeEnd=00:00:00:00
TakeUMID=0
TakeCircle=0
TakeNumberOfFrames=566
[/TAKE]
[TAKE:5]
TakeNumber=5
TakeNotes="None"
TakeTimecodeStart=00:01:19:16
TakeTimecodeEnd=00:01:35:23
TakeUserBits=00:00:00:00
TakeAltTimecodeEnd=00:00:00:00
TakeUMID=0
TakeCircle=0
TakeNumberOfFrames=408
[/TAKE]
[TAKE:6]
TakeNumber=6
TakeNotes="None"
TakeTimecodeStart=00:01:35:24
TakeTimecodeEnd=00:02:03:22
TakeUserBits=00:00:00:00
TakeAltTimecodeEnd=00:00:00:00
TakeUMID=0
TakeCircle=0
TakeNumberOfFrames=699
[/TAKE]
[/SCENE]
[SCENE:2]
SceneNumber=scene-2
SceneDate=3/29/2004
SceneTimecodeStart=00:04:24:04
SceneLocation=none
SceneUnit=none
SceneAudioChannels=none
SceneAudioType=Not Specified
SceneVideoFormat=1080psf_2398
SceneVideoSampleRate=RGB
SceneVideoBits=10
SceneVideoFrameBuffer=RGB
SceneTimecodeFormat=LTC_NDF
SceneTimecodeSource=INTERNAL
SceneTimecodeMode=RECORD_RUN
SceneTimecodeSync=SET_START
SceneFieldFrameFlag=Not Specified
SceneCameraType=VIPER
SceneCameraNumber=A
SceneNumberOfTakes=5
SceneLastTake=6
SceneNotes="None"
[TAKE:1]
TakeNumber=1
TakeNotes="None"
TakeTimecodeStart=00:02:03:23
TakeTimecodeEnd=00:02:57:15
TakeUserBits=00:00:00:00
TakeAltTimecodeEnd=00:00:00:00
TakeUMID=0
TakeCircle=0
TakeNumberOfFrames=1289
[/TAKE]
[TAKE:2]
TakeNumber=2
TakeNotes="None"
TakeTimecodeStart=00:02:57:16
TakeTimecodeEnd=00:03:07:16
TakeUserBits=00:00:00:00
TakeAltTimecodeEnd=00:00:00:00
TakeUMID=0
TakeCircle=0
TakeNumberOfFrames=241
[/TAKE]
[TAKE:3]
TakeNumber=3
TakeNotes="None"
TakeTimecodeStart=00:03:07:17
TakeTimecodeEnd=00:03:44:14
TakeUserBits=00:00:00:00
TakeAltTimecodeEnd=00:00:00:00
TakeUMID=0
TakeCircle=0
TakeNumberOfFrames=886
[/TAKE]
[TAKE:4]
TakeNumber=4
TakeNotes="None"
TakeTimecodeStart=00:03:44:15
TakeTimecodeEnd=00:03:58:22
TakeUserBits=00:00:00:00
TakeAltTimecodeEnd=00:00:00:00
TakeUMID=0
TakeCircle=0
TakeNumberOfFrames=344
[/TAKE]
[TAKE:6]
TakeNumber=6
TakeNotes="None"
TakeTimecodeStart=00:03:58:23
TakeTimecodeEnd=00:04:24:04
TakeUserBits=00:00:00:00
TakeAltTimecodeEnd=00:00:00:00
TakeUMID=0
TakeCircle=0
TakeNumberOfFrames=606
[/TAKE]
[/SCENE]
[/REEL]
[/PRODUCTION]
```

At process block 205, the data is saved to a first storage device. This storage device is preferably a D.MAG digital magazine, previously disclosed, and should be removable, reusable, and erasable. At least, it should be able to hold either at least 216 Gbyles of recorded video 250 and audio 260 data, and associated metadata 265. It should also weigh under 20 pounds, and be easy to carry. Some instantiations provide for a bit transfer rate exceeding 2000 Mbits per second, and some are even faster, providing for transfer speeds in excess of 3000 Mbits per second.

At process block 210, the data stored on the D.MAG is edited non-linearly. In other embodiments, the data is edited non-linearly after being transferred to a different storage device 230 or even a different storage medium, as might happen if the data were transferred across a network 235.

At process block 215 the data is viewed. This may be done simultaneously with the recording 202, and in some embodiments two or more devices may be set up to view the data simultaneously, such as at the recording site, and at a remote site.

At process block 220 a first storage device, preferably a D.MAG, is removed from a recording device, preferably a DFR 100, and at process block 225 a second storage device is inserted into the recording device. The device may be hot-swapped; that is, removed without turning off the DFR 100.

Once a D.MAG has been removed, the data on it can be transferred to a different location, such as an video production studio, where the data can then be processed. The data might be transferred to archival storage 230, or it can be placed in a network docking station which will allow the data to be sent across a network 235, such as the internet or a private intranet, to a remote location. Once the data on the D.MAG has been transferred, the D.MAG unit can then be erased 240, and can then be reinserted 245 into the DFR 100 for more recording.

Exemplary Removable Digital Magazine Embodiment

FIG. 3 is a block diagram of a generalized recordable digital magazine 300, in which the digital magazine is light-weight and may be moved easily between recording devices, archiving devices, networking devices, etc.

The relationships shown between modules within the D.MAG indicate the main portions of the D.MAG; other portions are not shown for the sake of simplicity.

Depending on implementation modules of the D.MAG 300 can be added, omitted, split into multiple modules, combined with other modules, and/or replaced with like modules. In alternative embodiments, recordable digital magazines 300 with different modules and/or other configurations of modules perform one or more of the described techniques.

Figure 6:
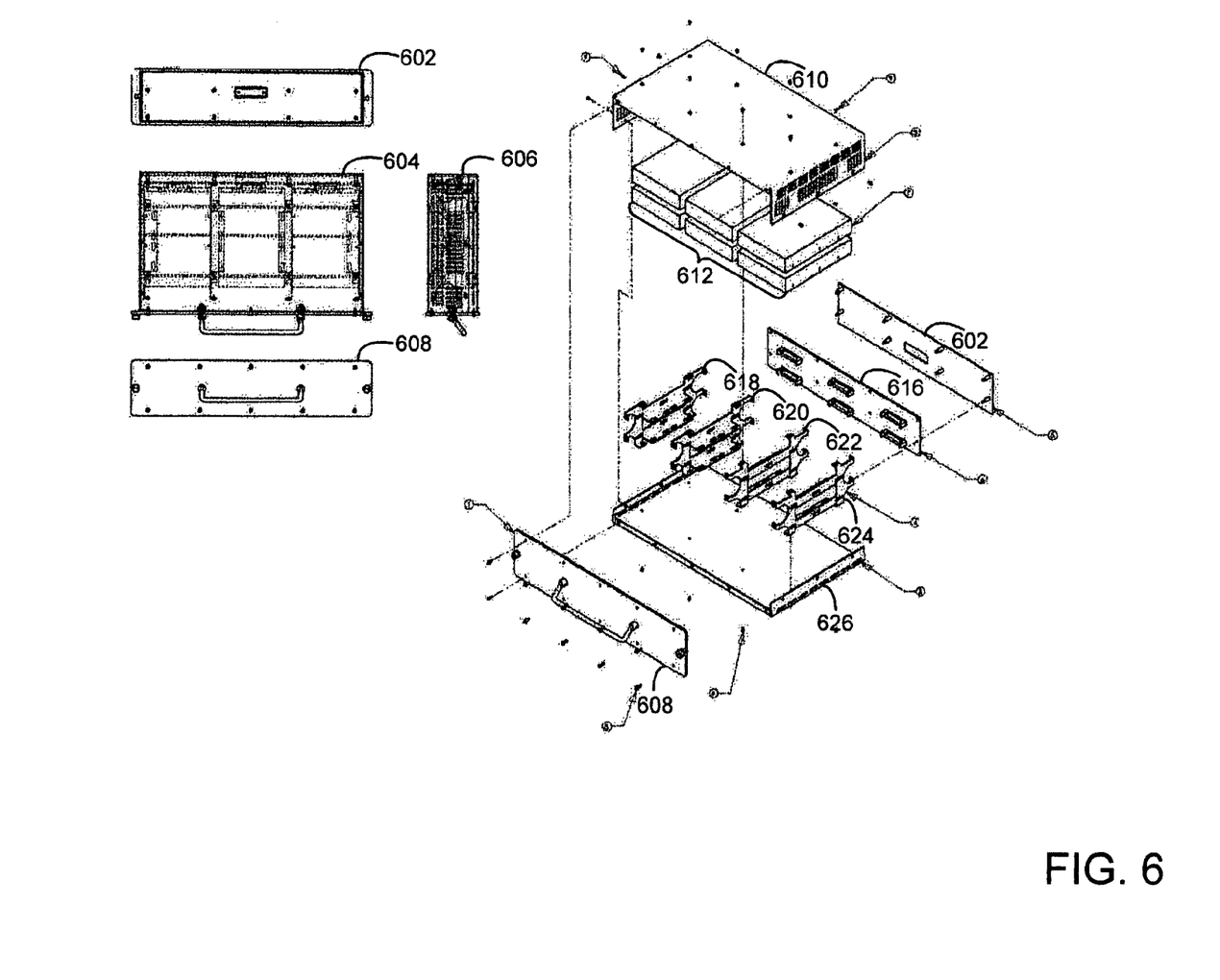
FIG. 6 is a schematic of a DMAG case assembly.

The Recordable Digital Magazine (D.MAG) 120, 300, in a preferred embodiment, weighs 10-15 pounds and is 14.5 inches wide, by 3.25 inches high, by 8 inches deep, and is comprised of a specially designed enclosure, as shown in FIG. 6. The entire apparatus 600 is designed to be securely and removably mounted in a variety of devices. The front panel 602 is designed with a handle to allow easy carrying. The top panel 604 includes structure for locking the storage device in position when mounted in mating receiving structures. Six fiber channel drives 612 are secured in four brackets, two 618, 620 with space for two drives apiece and two 624 with space for one drive apiece. In an alternate embodiment, brackets 622 and 624 hold two drives apiece, giving the device a total of 8 fiber channel drives. A backplane 616 contains brackets for each of the disk drives 612. A low-insertion-force (LIF) connector on the rear panel 602 connects the D.MAG to other, coupling, devices.

In an exemplary embodiment, the D.MAG also includes a status screen 320, which, preferably, is a flat user-definable LCD display with battery back-up. It has sufficient memory to place up to eight pages of information about the material stored on the magazine and details of the of the production itself. This data can be read even when the D.MAG is on a shelf.

Figure 4:
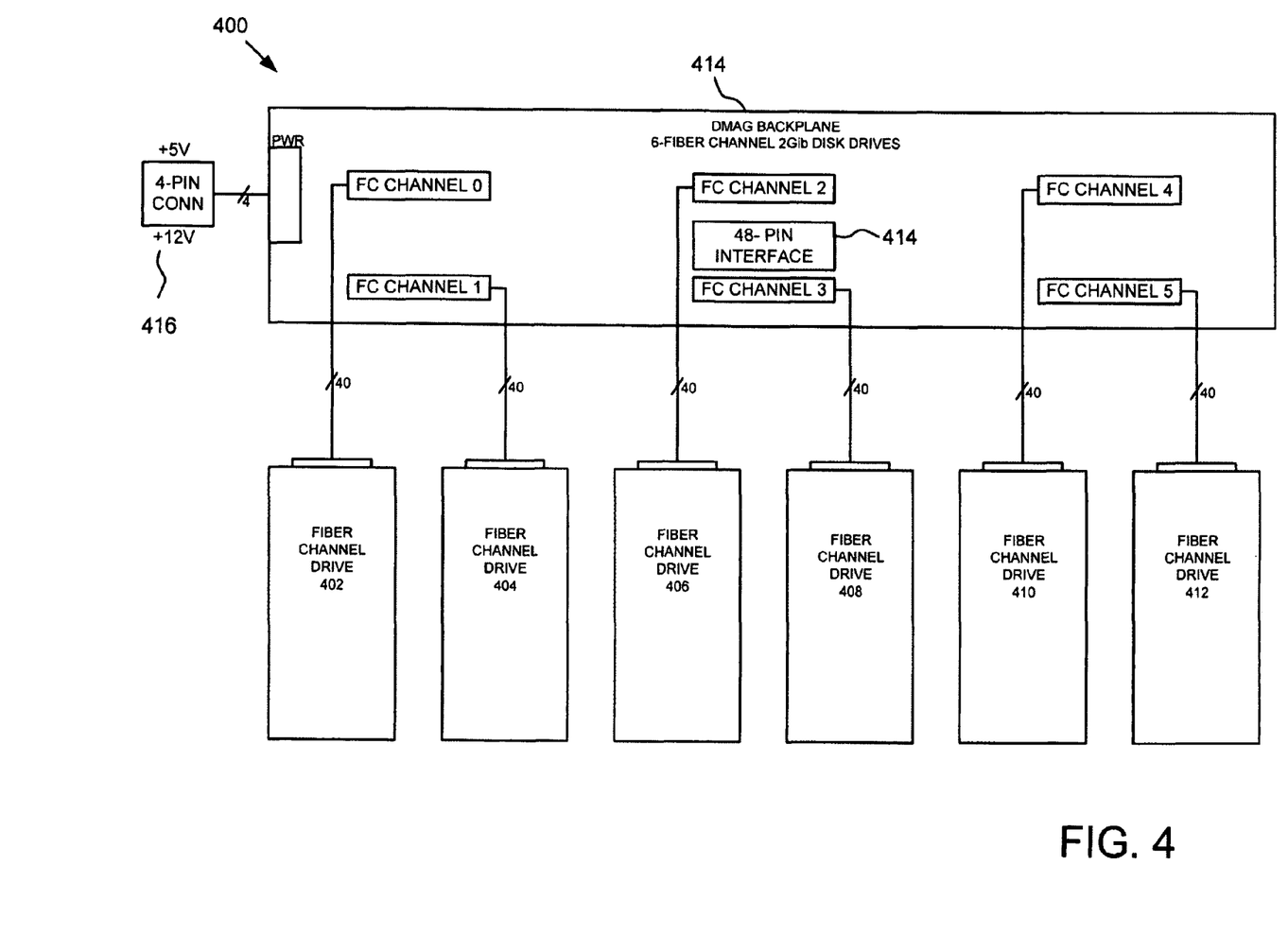
FIG. 4 is a block diagram of a fiber channel drive configuration for implementing the recordable digital magazine as described herein.

The D.MAG further includes a novel pair of backplanes. With reference to FIG. 4, on the first backplane 325, 414 a pair of 2 gigabit Fibre Channel circuits 335, 340 are routed from a specialized low insertion force (LIF) 48 pin connector 330, 418 to the four, six, or 8 2 Gigabit disk drives 402-410 that are connected directly to the backplane 414. In an alternate embodiment, another disk drive interface could be used, such as SCSI or ATA. The backplane carries the data signals from the disk drives to the LIF connector, 416 which can mate to a matching connector in a D.MAG "receiver". A 4-pin connector 415 is used to route power to the backplane, preferably in the 5-12 volt range.

With reference to FIG. 5, and continuing reference to FIG. 3, the second, mating backplane 345, 502 routes those signals from the first backplane 400 using a router 355 from the LIF to an off-the-shelf Fibre Channel HBA (Host Bus Adapter) 350. The HBA allows transfer of the Fibre Channel data to another data storage device, to a network, etc. Two 1 Gigabit Ethernet connections (a dual Gigabit Ethernet Connection) are used to provide data transfer speed of 2 Gigabits. In alternate embodiments, only one 1 Gigabit Ethernet connection is provided.

The D.MAG 300 can be inserted into various docking stations, including a cloning docking station 360, an archiving docking station 365, and a network docking station 370.

The docking stations preferably share common buttons and mechanical layout. The upper D.MAG receiver is present on all models. Next to the receiver is a load/unload button and a status LED.

The archival docking station 365 (A.DOCK) is designed to make data tape backups of D.MAG uncompressed images. Normally, two tapes are made simultaneously of each D.MAG magazine, giving tow original mirror data tape sets. This allows a security copy to be kept while the other copy is used in production.

Figure 7:
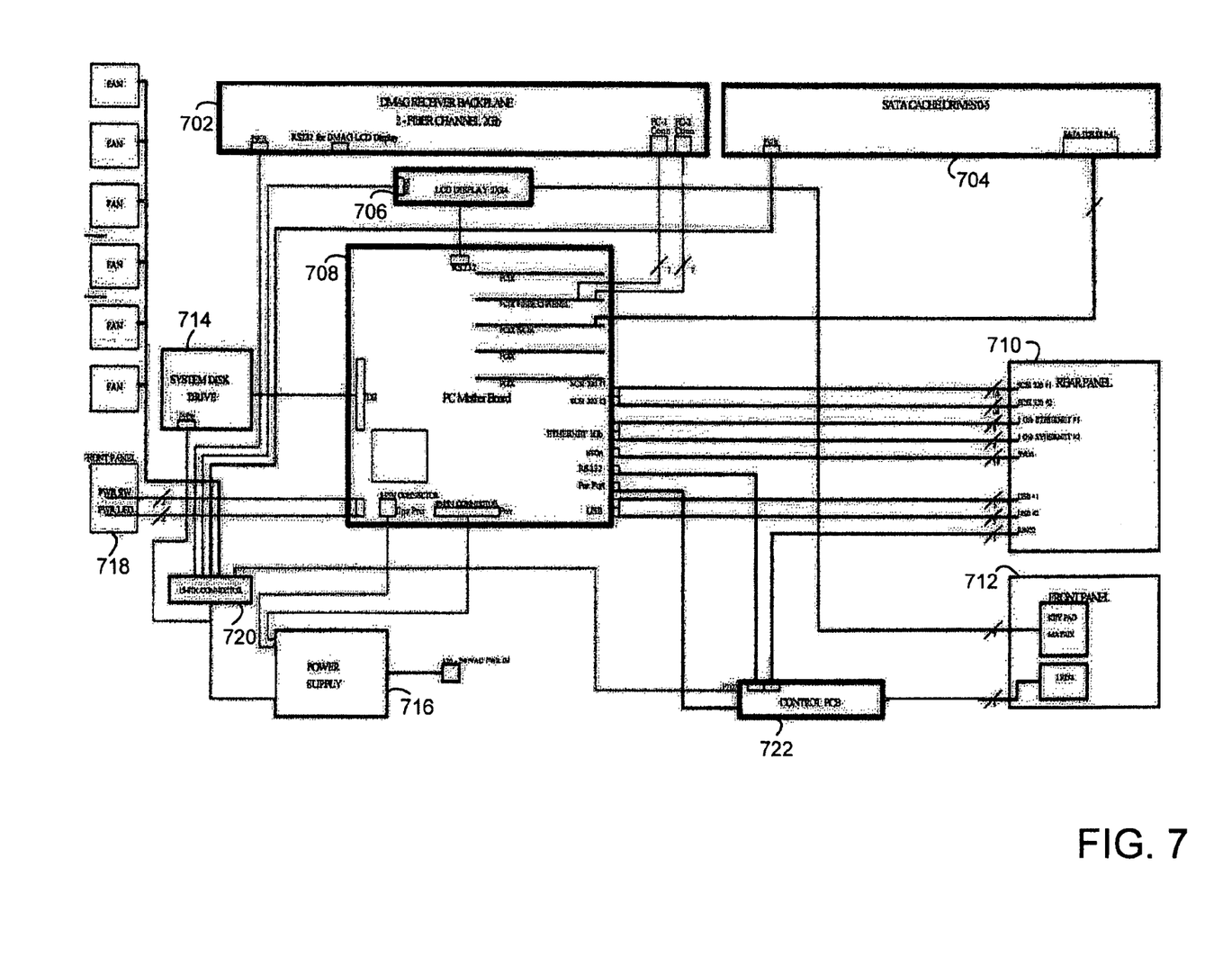
FIG. 7 is a block diagram of an A.DOCK hardware implementation.

With reference to FIG. 7, and continuing reference to FIG. 3, The A.DOCK 365 comprises an enclosure with at least one D.MAG "receiver," backplane 702, a computer motherboard 510, a power supply 716, a "disk cache" comprised of multiple off-the-shelf computer hard disk drives installed in a specialized enclosure 704, a front panel 712 which itself comprises a keypad buttons to control the operation of the unit, and LCD's, an LCD display 706 for menus, status and other user-specific information, and a rear panel comprising external connections, including at least one 1 gigabit Ethernet connection, at least one SCSI port, an RS422 connection, and two USB connections, provided for peripherals such as keyboards and mice. An XGA connection for monitors is also preferably provided. A preferred embodiment has two one gigabit Ethernet connections. One is normally set to a static IP address, the other is set for DHCP auto connections.

A D.MAG magazine 300 that has been recorded in a DFR 100 may be inserted into the A.DOCK "receiver". Software then reads the front panel switches to determine which operation is to be performed. Normally, the information on the D.MAG 300 will be copied to the internal disk cache. If a tape library is connected and the user chooses the archival function, the information now in the disk cache is transferred to the data tape in the tape library. The D.MAG can then be "erased," removed from the A.DOCK, and reused for the next recording session in the DFR. Another function allows the user to copy the material from a data tape into the internal disk cache, and then onto a "blank" D.MAG 300.

The data tapes are preferably created using the universal GNU TAR format. Archives can span multiple tape cartridges. Tapes created on the A.DDOCK can be restored almost anywhere on any compatible tape drive, which can either be a single tape drive, or a library of tapes. Redundant backup is supported. The following external connections are among those available: 2 Gigabit Ethernet connections, 2 USB Serial Bus, 15 pin D.SUB XVGA, Firewire, Dual SCSI Ultra 320 LVD, dual SCSI High Density 68 pin, and an AC input.

A.DOCKs are designed to work with an automated tape library system. Many of the functions are supported with software provided with the A.DOCK system.

Some A.DOCKs 365 also add a real time HD Video playback function which allows the docking station to play D.MAG RGB images out to standard HD video destinations.

The cloning docking station 360 (C.DOCK) is a studio cloning station for D.MAG magazines. The C.DOCK preferably comprises an enclosure with two D.MAG "receivers," a computer motherboard, an AC power supply, an LCD display for menus, status and other user-specific information, push buttons to control the operation of the unit, and external connections for computer networks. A D.MAG that has been recorded in a DFR is inserted into one of the C.DOCK "receivers". Software then reads the front panel switches to determine which operation is to be performed. Normally, the information on the D.MAG will be copied to a second "blank" D.MAG that has been inserted into the second receiver. This operation provides the user with a "safety" copy of his captured material while the original is transported or modified. The C.DOCK 360 also has all of the functionality of the network docking station 370.

The C.DOCK 360 is preferably available with different options to provide connectivity to outboard archiving and downloading solutions including tape libraries, large RAID system, individual tape and disc drives and Storage Area Networks. The cloning itself is done at close-to-real-time speeds.

The network docking station 370 (E.DOCK) comprises an enclosure with one D.MAG "receiver," a computer motherboard, AC power supply, an LCD display for menus, status and other user-specific information, push buttons to control the operation of the unit, and external connections for computer networks. A D.MAG 300 that has been recorded in a DFR 100 is inserted into the unit's D.MAG "receiver". A user can then gain access to the material recorded on that D.MAG 300 over an Ethernet network. If the material is transferred to another storage device on the network, the D.MAG 300 can then be "erased" and reused in a DFR in the next recording session. The nature of this type of network connection allows virtually any computer system to gain access to material recorded directly from a camera or other video and audio source.

Alternate Embodiments

Having described and illustrated the principles of our invention with reference to the illustrated embodiments, it will be recognized that the illustrated embodiments can be modified in arrangement and detail without departing from such principles. Elements of the illustrated embodiment shown in software may be implemented in hardware and vice versa. Also, the technologies from any example can be combined with the technologies described in any one or more of the other examples.

In view of the many possible embodiments to which the principles of the invention may be applied, it should be recognized that the illustrated embodiments are examples of the invention and should not be taken as a limitation on the scope of the invention. For instance, various components of systems and tools described herein may be combined in function and use. We, therefore, claim as our invention all subject matter that comes within the scope and spirit of these claims.

We claim:

1. A portable digital film recording system comprising:
   a portable case;
   a computer;
   a display;
   at least one removable, reusable, computer-readable digital data storing, digital magazine; the digital magazine storing the computer-readable digital data, real-time, in DPX file format; the digital data comprising uncompressed high definition video footage, uncompressed audio footage, and metadata;
   the digital magazine comprising:
      a backplane;
      at least two digital storage devices electrically coupled with the backplane; and
      at least one low insertion force connector, electrically coupled with the backplane;
      the digital magazine having a data transfer rate of at least four gigabits per second from the at least two digital storage devices through the low insertion force connector;
   a digital magazine receiver comprising:
      a backplane; and
      a low insertion force connecter, shaped to removably engage the low insertion force connector of the digital magazine;
   a control and connector panel, including one or more connectors shaped to removably, electrically couple with at least one external device; the at least one external device comprising: a camera, a video monitor, an audio recorder, headphones, a computer network, an edit controller, a microphone, or a signal generator;
   software operative on the computer to facilitate communication between the at least one external device and the digital magazine; and
   at least one power source;
   the portable digital film recording system having a total weight of not over 50 lbs.

2. The portable digital film recording system of claim 1 wherein the power source is used to turn power on the film recording system, and wherein the digital magazine can be removed from the film recording system without turning the power off the film recording system.

3. The portable digital film recording system of claim 1 wherein at least a portion of the digital data is stored in at least one of the following formats HD, HD RGB, or 2K.

4. The portable digital film recording system of claim 1 wherein the audio footage comprises 6 or 8 channels.

5. The portable digital film recording system of claim 1 wherein the reusable digital magazine holds up to 54 minutes of DPX RGB file images.

6. The portable digital film recording system of claim 1 further comprising at least one of an RS422 control, a USB serial port, an Ethernet connection, a RS232 control, a wireless network, a USB port, a port designed to directly connect to a camera, or a Firewire port.

7. The portable digital film recording system of claim 1 wherein the control and connector panel further comprises up to 38 connectors for connecting to external devices.

8. The portable digital film recording system of claim 1 further comprising at least two power sources, the second power source further comprising at least one of a battery, an AC power source, or a DC power source.

9. The portable digital film recording system of claim 1 wherein the software further comprises at least one converter which converts digital information from one format to a different format.

10. The portable digital film recording system of claim 1 wherein the computer controls the digital film recording system and wherein the computer is controlled by a remote computing device.

11. The portable digital film recording system of claim 1 wherein the at least one external device is operable to provide for viewing of the digital data without further processing of the digital data.

12. A method of recording video, the method comprising:
 providing a portable recording apparatus comprising:
  a portable case;
  a computer;
  a display;
  at least one hot-swappable, reusable, digital magazine comprising:
   a backplane;
   at least two digital storage devices electrically coupled with the backplane; and
   at least one low insertion force connector, electrically coupled with the backplane;
  a digital magazine receiver comprising:
   a backplane; and
   a low insertion force connecter, shaped to removably engage the low insertion force connector of the digital magazine;
  a control and connector panel, including one or more connectors shaped to removably, electrically couple with at least one external device; the at least one external device comprising: a camera, a video monitor, an audio recorder, headphones, a computer network, an edit controller, a microphone, or a signal generator;
  software operative on the computer to facilitate communication between the at least one external device and the digital magazine; and
  at least one power source;
  the portable recording apparatus having a total weight of not over 50 pounds;
 recording data on the portable recording apparatus, real-time, in DPX file format, the data comprising uncompressed moving images and uncompressed audio;
 transferring the data to the digital magazine through the low insertion force connector at a rate of at least four gigabits per second and saving at least a portion of the data on the digital magazine; the digital magazine weighing not more than 15 lbs;
 viewing the saved data from the digital magazine on the display, without further modification of the data;
 transferring at least a portion of the saved data from the digital magazine to an archival storage device in real time;
 moving the saved data from the digital magazine to a different location across a network;
 editing the saved moving images on the digital magazine non-linearly;
 erasing at least a portion of the data off of the digital magazine; and
 reinserting the digital magazine into the portable recording apparatus.

13. The method of claim 12 wherein the recording further comprises recording metadata, the metadata further comprising at least one of automatic data, user-generated data, and file system data.

14. The method of claim 13 wherein the user-generated data is input using one of a laptop or a PDA networked to the first storage device.

15. The method of claim 12 further comprising removing the digital magazine from the portable recording apparatus, and inserting a second digital magazine into the portable recording apparatus.

16. The method of claim 12 wherein viewing comprises at least two users viewing the data simultaneously.

\* \* \* \* \*